(12) United States Patent
Phillips et al.

(10) Patent No.: US 6,801,360 B2
(45) Date of Patent: Oct. 5, 2004

(54) POLARIZED LENS FORMED BY INJECTION/COINING INJECTION MOLDING PROCESS

(75) Inventors: Richard A. Phillips, S. Darmouth, MA (US); Peter C. Colarusso, Saugus, MA (US); Darrell C. Pope, Coconut Creek, FL (US)

(73) Assignee: International Polarizer, Inc., Marlborough, MA (US)

( * ) Notice: Subject to any disclaimer, the term of this patent is extended or adjusted under 35 U.S.C. 154(b) by 54 days.

(21) Appl. No.: 10/281,623

(22) Filed: Oct. 28, 2002

(65) Prior Publication Data

US 2004/0080824 A1 Apr. 29, 2004

(51) Int. Cl.⁷ .............................. G02B 5/30; G02C 7/12
(52) U.S. Cl. ...................... 359/490; 359/485; 351/163
(58) Field of Search .................. 264/1.32; 359/483, 359/485, 490, 491; 351/49, 159, 163

(56) References Cited

U.S. PATENT DOCUMENTS

| | | | |
|---|---|---|---|
| 2,674,159 A | * 4/1954 | Binda | .......... 156/164 |
| 3,786,119 A | * 1/1974 | Ortlieb | ....... 264/1.32 |
| 3,940,304 A | * 2/1976 | Schuler | ....... 264/1.32 |
| 4,035,527 A | 7/1977 | Deeg | |
| 4,944,584 A | 7/1990 | Maeda et al. | |
| 5,051,309 A | 9/1991 | Kawaki et al. | |
| 5,164,228 A | 11/1992 | Peralta et al. | |
| 5,223,862 A | 6/1993 | Dasher et al. | |
| 5,246,499 A | 9/1993 | Peralta et al. | |
| 5,246,728 A | 9/1993 | Rodriquez | |
| 5,286,419 A | 2/1994 | van Ligten et al. | |
| 5,351,100 A | 9/1994 | Schwenzfeier et al. | |
| 5,410,014 A | 4/1995 | Haese et al. | |
| 5,434,707 A | 7/1995 | Dalzell et al. | |
| 5,531,940 A | 7/1996 | Gupta et al. | |
| 5,550,599 A | 8/1996 | Jannard | |
| 5,648,832 A | 7/1997 | Houston et al. | |
| 5,654,380 A | 8/1997 | Kawai et al. | |
| 5,689,323 A | 11/1997 | Houston et al. | |
| 5,815,848 A | 10/1998 | Jarvis | |
| 5,827,614 A | 10/1998 | Bhalakia et al. | |
| 5,963,293 A | 10/1999 | Jannard | |
| 5,969,789 A | 10/1999 | Houston et al. | |
| 6,010,218 A | 1/2000 | Houston et al. | |
| 6,038,705 A | 3/2000 | Jarvis | |
| 6,168,271 B1 | 1/2001 | Houston et al. | |
| 6,220,703 B1 | 4/2001 | Evans et al. | |
| 6,256,152 B1 | 7/2001 | Coldrey et al. | |
| 6,270,698 B1 | 8/2001 | Pope | |
| 6,328,446 B1 | 12/2001 | Bhalakia et al. | |
| 6,455,163 B1 | * 9/2002 | Okamoto et al. | ........... 428/412 |
| 6,638,450 B2 | * 10/2003 | Richard | ..................... 264/1.32 |
| 6,650,473 B2 | * 11/2003 | Nakagoshi | ................. 264/1.32 |
| 6,659,608 B2 | 12/2003 | Yamamoto et al. | ......... 351/163 |
| 2002/0044352 A1 | 4/2002 | Yamamoto et al. | |

* cited by examiner

Primary Examiner—John Juba, Jr.
(74) Attorney, Agent, or Firm—Downs Rachlin Martin PLLC

(57) ABSTRACT

A polarized lens formed by an injection/coining injection molding process is disclosed. The polarized lens includes a polarizing insert formed from a polarizer sandwiched between two layers of cellulosic material. The polarizing insert is surrounded by high-impact polymer formed by a two-step injection/coining process of injection molding that results in minimal stress in the lens.

9 Claims, 3 Drawing Sheets

POLARIZED LENS FORMED BY INJECTION/COINING INJECTION MOLDING PROCESS

CROSS-REFERENCE TO RELATED APPLICATIONS

The present application is related to U.S. patent application Ser. No. 10/281/669 by the same inventors and entitled "Processes for forming a polarized lens via injection/coining injection molding," filed on the same day as the present patent application, and which application is incorporated by reference herein.

FIELD OF THE INVENTION

The present invention pertains to polarized lenses, and in particular to polarized high-impact-polymer lenses manufactured by an injection/coining injection molding process.

BACKGROUND OF THE INVENTION

Polarized lenses for eyewear have been in use for over 50 years (see, e.g., U.S. Pat. No. 2,237,567 to Land, and U.S. Pat. No. 2,445,555 to Binda). Polarized lenses can selectively eliminate glare that originates from the reflection and subsequent polarization of light from flat surfaces such as a pavement, water, sand or snow. Thus, polarized lenses are particularly useful for outdoor activities such as driving, fishing, sailing, sunbathing, and skiing.

One popular type of polarized lens is formed from a sheet polarizer, which is a thin layer of polyvinyl alcohol sandwiched between two layers of a cellulosic film, such as cellulose acetobutyrate or cellulose triacetate. Although sheet polarizer lenses are light-weight and inexpensive to produce, they deform easily, are not highly impact resistant, and have no corrective power (i.e., are plano).

Many popular and economical polarized lenses are based on iodine. Others are based on dichroic dyes. Iodine polarizers have high polarizing efficiency. Dichroic dyes are typically less efficient but have higher temperature stability and higher moisture resistance than iodine-based polarizers.

Early improvements in the lenses involved placing a wafer of sheet polarizer inside of a mold, and casting CR39 monomer around the wafer. U.S. Pat. No. 4,090,830 to LaLiberte describes this casting process. The mold is then placed in a water bath and cured at varying temperature for 12 to 24 hours during which time the monomer polymerizes into a hard precisely curved shape. An improvement to this process is described in U.S. Pat. No. 3,940,304 to Schuler. The improvement involves coating a polarizing wafer with a thin tie coat of melamine formaldehyde, then no forming it to match the curvature of one of the mold surfaces, and placing it inside of the mold before it is filled with CR39 monomer. The resulting lens is polarized and can be either plano, or a prescription lens with power. CR39 lenses are hard but do not have high impact resistance. They are suitable for dress eyewear, but not for sport applications or for children who engage in rough and tumble play.

Another process of forming a polarized lens is described in U.S. Pat. No. 6,328,446 to Bhalakia et al. and involves laminating the polarizing wafer onto the front of an existing lens. However it has been frequently found that the lamination process is difficult and results in a low yield. A common problem encountered by this laminating approach is that variations in the thickness of the single layer of adhesive can lead to distortion. Moreover, laminations are particularly difficult with lenses having different curvatures in different parts of the surface, such as occurs in bifocal or progressive powered lenses.

Another process for forming a polarized lens is described in U.S. Pat. No. 6,334,681 to Perrott et al. and in U.S. Pat. No. 6,256,15 Coldray et al. The process involves laminating the polarizing wafer between two optical members. This approach is more costly than that involving a single optical member, though it has the advantage of the polarizer being well protected between the optical members. Optical distortion, caused by variations in the curvature of the polarizing wafer, are canceled out by variations in the thickness of the adhesive, provided that the index refraction of the polarizer matches that of the adhesive.

More recently, U.S. Pat. No. 5,051,309 to Kawaki et al. discloses a polarized lens in which the polarizing layer is sandwiched between two sheets of polycarbonate. The polycarbonate is stretched, resulting in high stress and thus high birefringence. The stretch axis is aligned with the absorption axis of the polarizer. The birefringence of the polycarbonate is not noticed when viewing the lens perpendicular to its surface. However when viewed at an angle to its surface, the high birefringence causes interference fringes. By using highly stretched polycarbonate, the fringes are high order and washed out and so are not noticeable by the user of the lens. The resulting sandwich of polycarbonate is then thermoformed. Polycarbonate requires higher temperatures and longer times to thermoform than do cellulosic films. The polarizer is preferably a dichroic polarizer, although some iodine may be included to improve the polarizing efficiency. Unfortunately, polycarbonate has relatively high optical dispersion, which results in chromatic dispersion. Thus, when certain objects such as streetlights are viewed off-axis, a halo of blue light is seen to one side of the image.

Although polycarbonate is known for high impact resistance, its strength is reduced by internal stresses. Thus, to meet impact tests for safety glasses, certain polycarbonate lenses are made 2.4 mm thick. However, when such lenses are mounted in eyeglass frames with a wraparound design, they have residual power and prismatic effects. The lenses often do not meet the European Class 1 standards and fall into the Class 2 category. This characterization of the lenses as "second class" is a drawback.

One approach to forming lenses from polycarbonate is to use thermoformed polycarbonate sheet as inserts and then injection molding polycarbonate around the sheet. Since each side of the injection mold can be precisely made, the resulting lens has no unwanted power or prismatic effect. By correctly designing the mold surfaces, prescription ophthalmic lenses of any desired power can be manufactured. The bond between the polycarbonate polarizer and the injected polycarbonate is quite strong. However, conventional injection molding introduces considerable stress into molded parts. This stress adds to the stress in the thermoformed polycarbonate insert. Great care must be taken in mounting these lenses in frames so that the lens fits the frame groove exactly. Otherwise, additional stress is introduced by the frame, which can cause crazing of the edges and birefringent stress patterns when the lens is viewed off-axis.

Many attempts have been made to injection mold polycarbonate or polymethylacrylic around wafers containing Iodine-based polarizers. Unfortunately, all previous attempts have failed because the polarizer was destroyed by the high temperature necessary to achieve flow of the injected polymers.

SUMMARY OF THE INVENTION

A first aspect of the invention is an article comprising a polarizer sandwiched between first and second layers of cellulosic material. The polarizer plus the layers of cellulosic material form a polarizing insert. The polarizing insert is formed (e.g., thermoformed) to have a curvature corresponding to the surface curvature of a plate of an injection mold assembly. A high-impact polymer is formed adjacent at least one side of the polarizing insert by an injection/coining process of injection molding that results in minimal stress in the polarizing insert and the high-impact polymer.

A second aspect of the invention is a polarized lens product. The product is formed by the process that includes sandwiching a polarizer between first and second layers of cellulosic material to form a polarizing insert. The process also includes shaping (e.g., thermoforming) the polarizing insert to have a curvature corresponding to the surface of a plate of an injection mold assembly. The process further includes injection molding a high-impact polymer adjacent at least one side of the insert by an injection/coining process. The process is performed to create minimal stress in the insert and the high-impact polymer.

In one aspect of the invention, a scratch-resistant coating is applied to at least one of the outer surfaces of the polarized lens.

DETAILED DESCRIPTION

In the following detailed description of the embodiments of the invention, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

The present invention is a polarized lens formed by injection molding, wherein the insert for the injection molding process includes a polarizer. In an example embodiment, the polarized lens is plano (i.e., has no power). In another example embodiment, the lens has power and so can serve, for example, as an ophthalmic prescription lens. The present invention provides an improved polarized lens formed from a high impact polymer (resin). The lens is stress relieved, and in an example embodiment meets or exceeds standardized impact resistance test.

The injection molding process used in making the polarized lens of the present invention is described in U.S. Pat. No. 6,270,698 to Pope ("the Pope patent"), entitled "Stress-relieved acrylic optical lenses and methods for manufacture by injection coining molding," which patent is incorporated herein by reference. The injection molding process of the Pope patent includes two steps: a conventional injection step, followed a compression or "coining" step. Thus, the injection molding process of the Pope patent is referred to hereinafter as "the injection/coining process."

In an example embodiment of the injection/coining process, the separation of the mold plates of the mold assembly under reduced or less than full tonnage is minimal, and further in the example embodiment is generally 0.5 mm or less.

Figure 1:
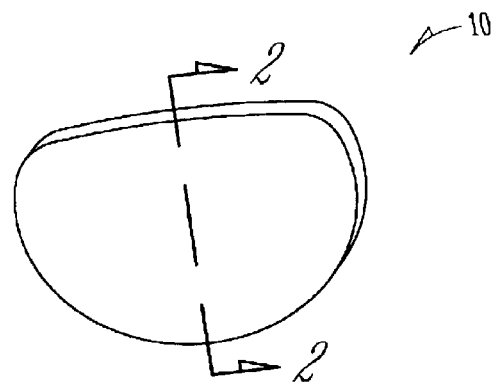
FIG. 1 is a perspective view of an example embodiment of a polarized lens of the present invention.
Figure 2:
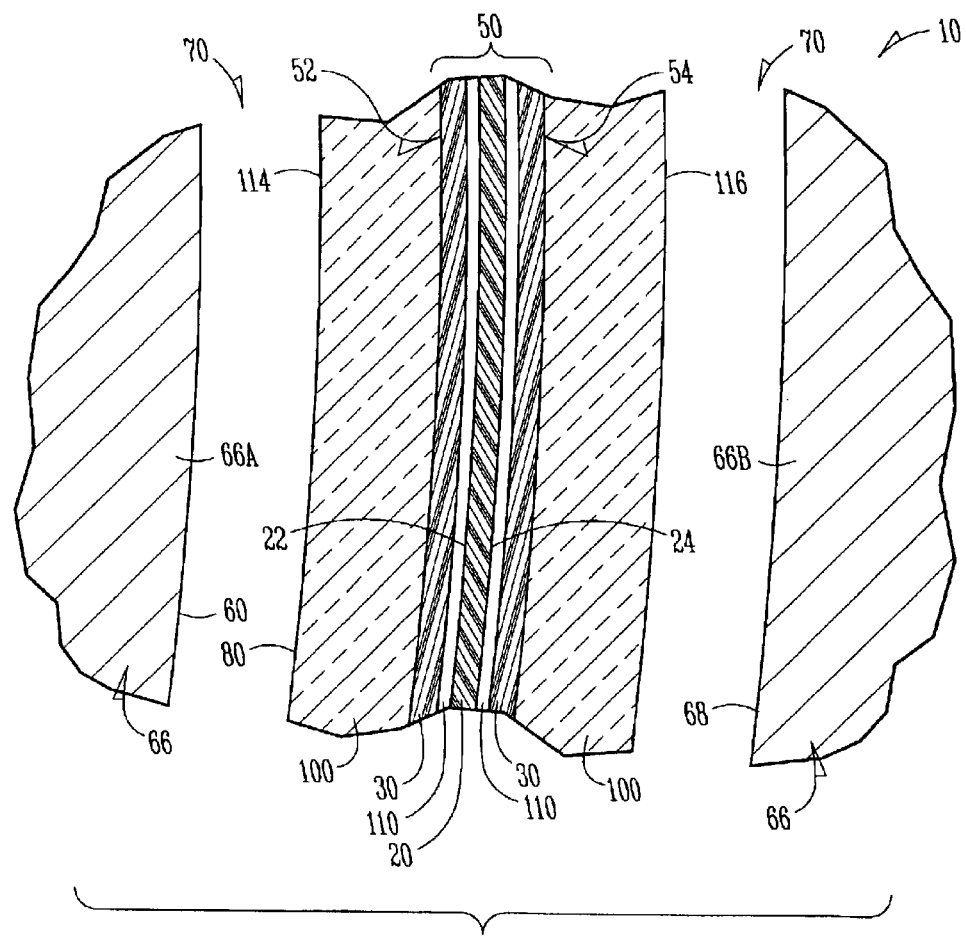
FIG. 2 is a partial cross-sectional diagram of an embodiment of the polarized lens of FIG. 1 taken along the line 2—2, further showing the injection mold.

FIG. 1 is a perspective view of an example embodiment of a polarizing (or polarized) lens of the present invention, and FIG. 2 is a partial cross-sectional diagram of an embodiment of the polarized lens of FIG. 1 taken along the line 2—2.

With reference to FIG. 2, in an example embodiment of the invention, a polarized lens 10 includes a polarizer 20, e.g., in the form of a polarized sheet or wafer. Polarizer 20 has first and second sides (surfaces) 22 and 24. In a preferred example embodiment, polarizer 20 is iodine-based. In another example embodiment, polarizer 20 is a dichroic die polarizer, polyvinylene (i.e., "k-sheet"), or polyacetelyne. It will be apparent to those skilled in the art that a number of known polarizer films can be utilized in the present invention and that the above constitutes only a partial list by way of providing a few examples. In an example embodiment, polarizer 20 has a total thickness between 0.09 mm and 2.6 mm inclusive. Further in the example embodiment, the total thickness of polarizer 20 is between 0.7 and 1.2 mm inclusive.

Polarizer 20 is sandwiched between two layers 30 of cellulosic material (e.g., in the form of a film) to form a polarizing insert 50 suitable for inserting into an injection mold assembly for carrying out the injection/coining process. Polarizing insert 50 includes opposite first and second sides 52 and 54, respectively. In an example embodiment, the cellulosic material is cellulose aceto butyrate. In an example embodiment, the thickness of each cellulosic layer 30 is in the range between 0.003 inch and 0.045 inch inclusive, and further in an example embodiment is about 0.029 inch thick. The polarizing insert 50 is thermoformed to a desired curvature using conventional thermoforming techniques.

In an example embodiment, the desired curvature of the polarizing insert 50 corresponds to the curvature of one of the mold surfaces in the injection molding apparatus used to form polarized lens 10. With particular reference to FIG. 2, in an example embodiment, the curvature of polarizing insert 50 matches or substantially matches the curvature of a rear surface 60 of an injection mold assembly 66. Injection mold assembly 66 also includes a rear mold plate 66A with rear surface 60, and a front mold plate 66B with a front surface 68. Injection mold assembly 66 includes a cavity 70 defined by rear and front surfaces 60 and 68. The curvature of rear surface 60 defines the rear (i.e., eyeward or concave) surface 80 of the lens. When cast cellulosic film is used to form polarizing insert 50, virtually no birefringence is induced in the polarizer.

In an example embodiment of the process, prior to inserting polarizing insert 50 into cavity 70 of mold assembly 66, the polarizing insert is pretreated. In an example embodiment, the pretreatment includes heating the polarizing insert for 30 seconds at 150° F.

With continuing reference to FIG. 2, an injection-molded polymer 100 surrounds polarizing insert 50. In an example embodiment, improved bonding between the polarizing insert and the injection-molded polymer is attained when the polarizer 20 is coated on one or both sides (surfaces) 22 and 24 with respective tie coat layers 110. In an example embodiment, the tie coat layer is on the order of a micron thick. The tie coat layers serves as a barrier to the outward migration of additives in the cellulosic film layers 30 such as plasticizers, ultraviolet absorbers, release coatings, etc. The tie coat layers 110 also serves as an adhesion promoter.

In an example embodiment, the tie coat layers 30 include nitrocellulose, which has an absorption band at $1650\ cm^{-1}$. Cellulose acetobutyrate has a strong absorption band at $1740\ cm^{-1}$. Further in an example embodiment, the thickness of each nitrocellulose tie coat layer 110 is selected to provide an absorption ratio between the tie coat layer and the polarizer film ($1650\ cm^{-1}/1740\ cm^{-1}$) of between 0.90 and 1.5 inclusive. Further in the example embodiment, an exemplary absorption ratio is about 0.9. A nitrocellulose tie coat layer 110 works particularly well when the cellulosic material includes cellulose acetobutyrate. Other materials generally suitable for use as the tie coat layer 110 include di acetate, triacetate, and ethyl cellulose.

In an example embodiment, injection molded polymer 100 is a high-impact polymer. Further in an example embodiment, the high-impact polymer includes a blend of polymethyl methacrylate and butyldinene. This polymer blend can flow at temperatures low enough not to destroy the polarizer, and yet has superior impact resistance typical of polycarbonate. As it turns out, polycarbonate flows at a higher temperature than the polymer blend, and that injection molding with polycarbonate destroys the polarizer. The high-impact polymer blend bonds well to the polarizing insert during the molding process. Other high-impact polymers, such as polycarbonate or a blend of polycarbonate and polyethylene teraphthalate, may be used in place of the methacrylate butyldyene blend without departing from the scope of the invention.

In an example embodiment, injection-molded polymer 100 includes a blend of polycarbonate/polyethylene teraphthalate, also known as XYLEX, a trade name of the General Electric Corporation.

Another advantage of using a high-impact polymer over polycarbonate is that it has the clarity of glass or CR39, available from PPG, Inc., Pittsburgh, Pa. (CR39 is also known as alkyl diglycol carbonate), and does not have dispersion or chromatic aberrations that characterize polycarbonate.

In an example embodiment, the polarized lens 10 of the present invention is stress-relieved, possesses Class 1 optical characteristics, and meets or exceeds the standardized impact drop test for use in safety eyeglass lenses.

Further in an example embodiment, injection mold assembly 66 includes a two-plate runnerless mold assembly, such as described in the Pope patent, in which at least one of the mold plates 66A and 66B is movable. Cavity 70 is partially filled with high-impact polymer 100 under partial tonnage, while polarizer 20 or polarizing insert 50 is suspended within the mold. At least one of mold plates 66A and 66B of mold assembly 66 is then is controllably moved towards the other to coin and densify the high impact polymer under a secondary or full tonnage until a velocity-pressure changeover point is reached.

In an example embodiment, the high-impact polymer is heated to a temperature in the range of 400° F. to 460° F. to facilitate flow of the polymer into mold assembly 66. Further in an example embodiment, mold assembly 66 is heated to a temperature in the range of 100° F. to 140° F.

The molded polarized lens 10 is then removed from injection mold assembly 66. At this point, the lens has two outer surfaces 114 and 116.

Figure 3:
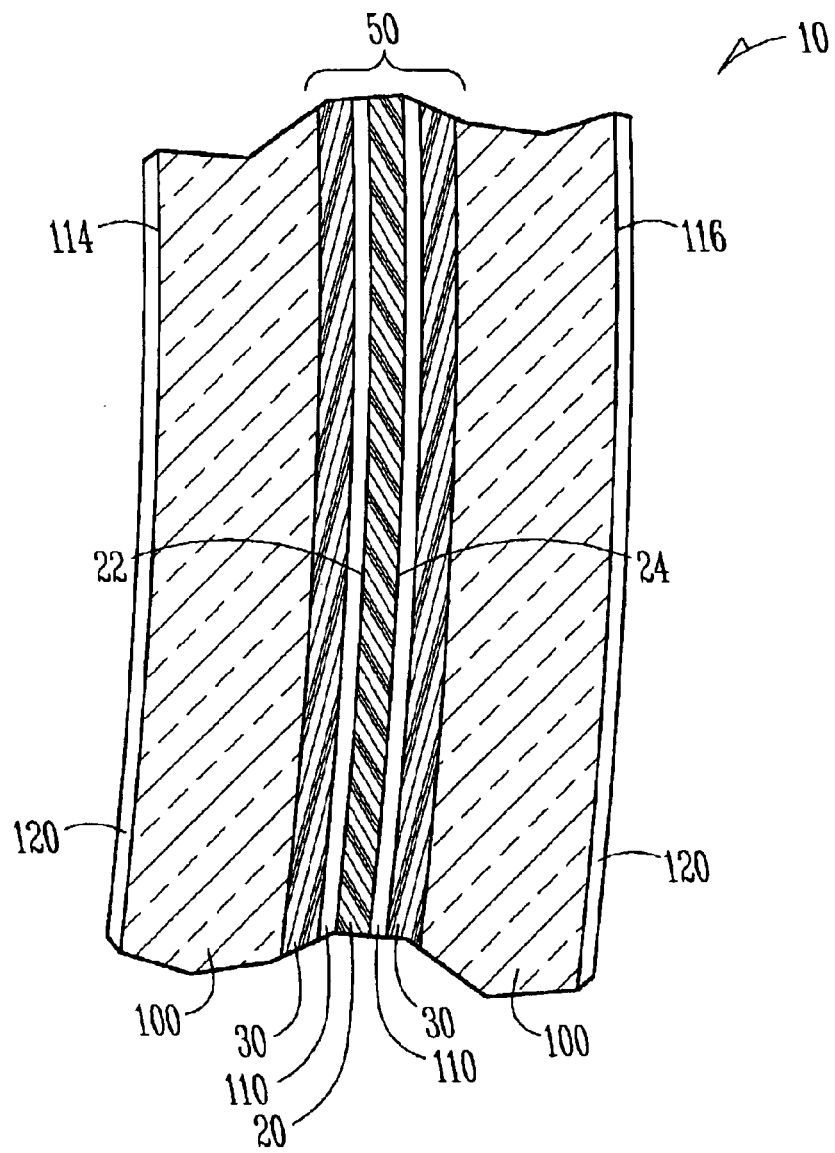
FIG. 3 is a partial cross-section of an embodiment of the polarized lens of FIG. 1 taken along the line 2—2, wherein the lens further includes a scratch-resistant coating on the outer surfaces of the lens.

With reference to FIG. 3, in an example embodiment, polarized lens 10 is then coated on at least on of outer surfaces 114 and 116 with a scratch-resistant coating 120, thereby producing a scratch-resistant and impact-resistant polarized lens. In an example embodiment, the scratch-resistant coating 120 is applied by dipping the lens in the coating solution in a clean environment, such as in a clean room or clean chamber. In an example embodiment, scratch-resistant coating 120 includes ninxlpyrrolidone, peta monomers and isopropanol.

Figure 4:
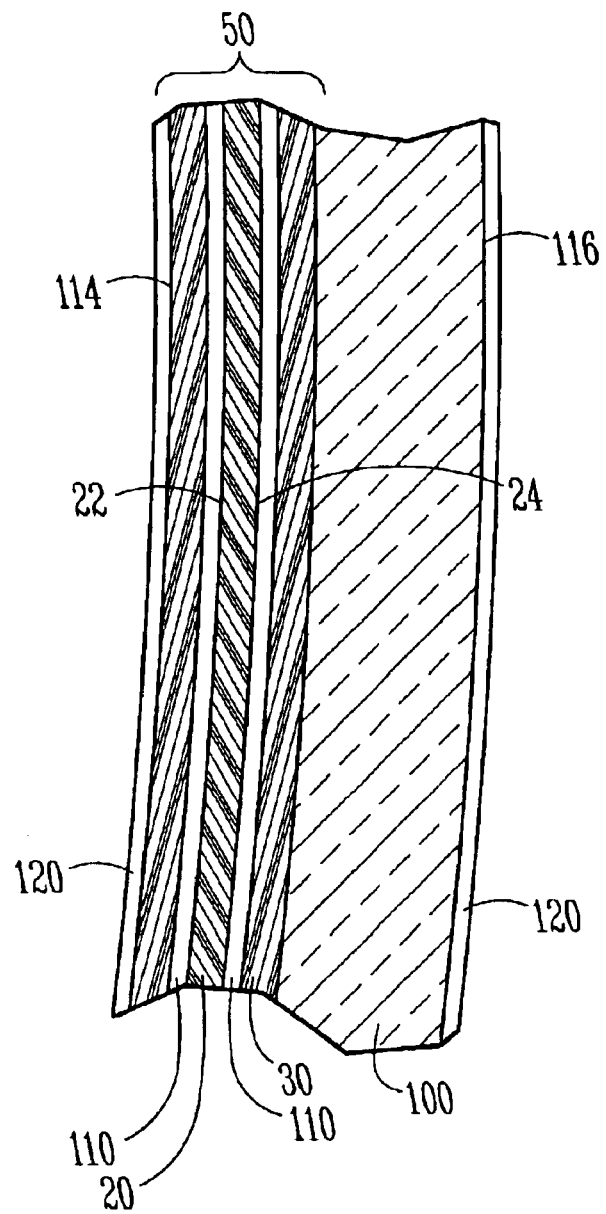
FIG. 4 is a partial cross-section of an embodiment of the polarized lens of FIG. 1 taken along the line 2—2, wherein the lens includes an injection-molded polymer is formed adjacent only one side of the polarizing insert.

With reference to FIG. 4, in another example embodiment, polarized lens 10 is formed so that the lens includes injection-molded polymer layer 100 adjacent only one of sides 52 and 54 of polarizing insert 50. This is accomplished by filling only the portion of cavity 70 between polarizing insert 50 and one of front surface 68 and rear surface 60 with polymer material, and then carrying out the injection/coining process.

Further in the example embodiment, scratch-resistant coating 120 is formed on at least one of the two outer surfaces 114 and 116 of the polarized lens.

Use of the injection/coining process of the Pope patent results in minimal stress in the injection molded polymer 100. Since the polarizer insert also has minimal stress, the resulting polarized lens 10 exhibits the full strength of the materials without the stress-related defects (e.g., birefringence). The greatest impact strength for the polarized lens 10 is obtained when the polarizer is placed toward the rear (eyeward or concave) side of the lens, as is shown in FIG. 2.

In an example embodiment, the polarized lens 10 is formed with a thickness of approximately 2.4 mm and meets or exceeds the American National Standards Institute (ANSI) Z87 Standard for Eye and Face Protection. The ANSI Z87 Standard involves the following tests:

Sec 15.1 High Velocity Test in which ¼ inch steel ball is propelled with a velocity of 150 ft. per sec. onto the lens Sec 15.2 High Mass Impact Test in which a 500 gram weight with a 30° conical tip is dropped onto the lens.

Sec Sec 15.5 Drop Ball Test in which a 1 inch diameter steel ball is dropped from a height of 50 inches onto the lens.

Sec 15.8.3 Needle Penetration Test in which a Singer sewing machine mounted in a needle in a 1.56 oz. holder is dropped on the lens from a height of 50 inches onto the lens.

EXAMPLES

The following six Examples outline results obtained from different experiments using the injection/coining process to form example embodiments of the polarized lens 10 of the present invention. The experiments were carried out to determine the proper process and structure for a suitable polarized lens.

Example 1

An iodine-based polarizer was bonded between two layers of cellulose acetobutyrate and was placed in mold assembly cavity 70. Polycarbonate was injected around the polarizer as part of the injection/compression process. The polarizer was destroyed by the high temperature needed for the polycarbonate to flow into the mold.

Example 2

An iodine-based polarizer was bonded between two layers of cellulose acetobutyrate to form a polarizing insert. The polarizing insert was placed in mold assembly cavity 70 and polymethyl methacrylate was injected around the polarizing insert as part of the injection/coining process. The polarizer, however, was destroyed by the high temperature needed for the polymethyl methacrylate to flow into the mold.

Example 3

An iodine-based polarizer was bonded between two layers of cellulose acetobutyrate to form a polarizing insert. The polarizing insert was coated on both sides with a tie coat layer of nitrocellulose. The tie-coated polarizing insert was placed in a mold assembly cavity 70 and a high-impact-polymer consisting of a blend of methacrylate and butyldyene was injected around the polarizer as part of the injection/coining process. The area of the polarizing insert near the gate of the mold cavity was bleached and did not bond well to the high-impact-polymer. The area of the polarizer away from the gate bonded well and did not bleach. By cutting away the region immediately adjacent to the gate, a cosmetically attractive and usable lens was obtained. The resulting lens was substantially free of stress.

Example 4

The same procedure as in Example 3 was used, except that the temperature of the injected polymer was slightly lowered. No bleaching of the polarizer occurred and the adhesion was satisfactory.

Example 5

The same procedure as in Example 3 was used, except that the nitrocellulose tie coat layer was omitted from the surfaces of the polarizing wafer. Significantly poorer bonding of the injection-molded polymer to the polarizing insert resulted.

Example 6

The procedure of Example 3 was followed, with polarizing insert 50 placed in mold assembly cavity 70 such that it was located nearest the front (convex) surface of the lens upon carrying out the injection/coining process. The resulting lenses of 2.4 mm thickness did not pass the ANSI Z87 tests.

Example 7

The procedure of Example 3 was followed, with the polarizing insert placed in mold assembly cavity 70 such that it was nearest the rear (concave) surface of the lens upon carrying out the injection/coining process. The resulting lenses of 2.4 mm thickness passed all ANSI Z87 tests.

In the foregoing Detailed Description, various features are grouped together in various example embodiments for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

While the present invention has been described in connection with preferred embodiments, it will be understood that it is not so limited. On the contrary, it is intended to cover all alternatives, modification and equivalents as may be included within the spirit and scope of the invention as defined in the appended claims.

What is claimed is:

1. An article, comprising:
   a polarizer sandwiched between first and second layers of cellulosic material to form a polarizing insert, the polarizing insert having opposite first and second sides and formed to have a curvature corresponding to a surface of an injection mold; and
   a high-impact polymer formed adjacent at least one of the first and second sides of the polarizing insert by an injection/coining process of injection molding that results in minimal stress in the polarizing insert and the high-impact polymer, wherein the high-impact polymer is a blend of polymethyl methacrylate and butyldyene.

2. An article, comprising:
   a polarizer sandwiched between first and second layers of cellulosic material to form a polarizing insert, the polarizing insert having opposite first and second sides and formed to have a curvature corresponding to a surface of an injection mold; and
   a high-impact polymer formed adjacent at least one of the first and second sides of the polarizing insert by an injection/coining process of injection molding that results in minimal stress in the polarizing insert and the high-impact polymer, wherein the high-impact polymer includes polycarbonate/polyethylene teraphthalate.

3. An article, comprising:
   a polarizer having first and second surfaces and sandwiched between first and second layers of cellulosic material to form a polarizing insert, the polarizing insert having opposite first and second sides and formed to have a curvature corresponding to a surface of an injection mold, the polarizing insert including tie coat layer formed on at least one of the first and second surfaces of the polarizer, the tie coat layer including nitrocellulose; and
   a high-impact polymer formed adjacent at least one of the first and second sides of the polarizing insert by an injection/coining process of injection molding that results in minimal stress in the polarizing insert and the high-impact polymer;
   wherein the tie coat layer and the polarizer have an absorption ratio at their respective absorption bands in the range between 0.95 and 1.50 inclusive.

4. An article, comprising:
   a polarizer sandwiched between first and second layers of cellulosic material to form a polarizing insert, the polarizing insert having opposite first and second sides and formed to have a curvature corresponding to a surface of an injection mold; and
   a high-impact polymer formed adjacent at least one of the first and second sides of the polarizing insert by an injection/coining process of injection molding that results in minimal stress in the polarizing insert and the high-impact polymer, wherein the high-impact polymer;
   wherein the article meets or exceeds the American National Standards Institute (ANSI) Z87 Standard for Eye and Face Protection.

5. An article, comprising:
   a polarizer sandwiched between first and second layers of cellulosic material to form a polarizing insert, the polarizing insert having opposite first and second sides and formed to have a curvature corresponding to a surface of an injection mold; and a high-impact polymer formed adjacent at least one of the first and second sides of the polarizing insert by an injection/coining process of injection molding that results in minimal stress in the polarizing insert and the high-impact polymer;

wherein the article has first and second opposing outer surfaces and includes a scratch-resistant coating formed over at least one of the first and second outer surfaces;

wherein the scratch-resistant coating is formed from a mixture of ninxlpyrrolidone, peta monomers and isopropanol.

6. A polarized lens product formed by the process comprising:

sandwiching a polarizer between first and second layers of cellulosic material to form a polarizing insert having first and second sides;

shaping the polarizing insert to have a curvature corresponding to a surface of an injection mold; and injection molding a high-impact polymer adjacent at least one of the first and second sides of the insert by a two-step injection/coining process performed so as to create minimal stress in the insert and the high-impact polymer, wherein the high-impact polymer in a blend of polymethyl methacrylate and butyldyene.

7. A polarized lens product formed by the process comprising:

sandwiching a polarizer between first and second layers of cellulosic material to form a polarizing insert having first and second sides, the polarizer having fist and second surfaces;

forming a tie coat layer on at least one of the first and second surfaces, the tie coat layer including nitrocellulose;

shaping the polarizing insert to have a curvature corresponding to a surface of an injection mold; and injection molding a high-impact polymer adjacent at least one of the first and second sides of the insert by a two-step injection/coining process performed so as to create minimal stress in the insert and the high-impact polymer;

wherein the tie coat layer and the polarizer have an absorption ratio at their respective absorption bands in the range between 0.95 and 1.50 inclusive.

8. A polarized lens product formed by the process comprising:

sandwiching a polarizer between first and second layers of cellulosic material to form a polarizing insert having first and second sides;

shaping the polarizing insert to have a curvature corresponding to a surface of an injection mold; and injection molding a high-impact polymer adjacent at least one of the first and second sides of the insert by a two-step injection/coining process performed so as to create minimal stress in the insert and the high-impact polymer;

wherein the product meets or exceeds the American National Standards Institute (ANSI) Z87 Standard for Eye and Face Protection.

9. A polarized lens product formed by the process comprising:

sandwiching a polarizer between first and second layers of cellulosic material to form a polarizing insert having opposite first and second sides, the polarizer having first and second opposing surfaces;

forming a scratch-resistant coating over at least one of the first and second opposing surfaces;

shaping the polarizing insert to have a curvature corresponding to a surface of an injection mold; and injection molding a high-impact polymer adjacent at least one of the first and second sides of the insert by a two-step injection/coining process performed so as to create minimal stress in the insert and the high-impact polymer;

wherein the scratch-resistant coating is formed from a mixture of ninxlpyrrolidone, peta monomers and isopropanol.

* * * * *